Figure 1:
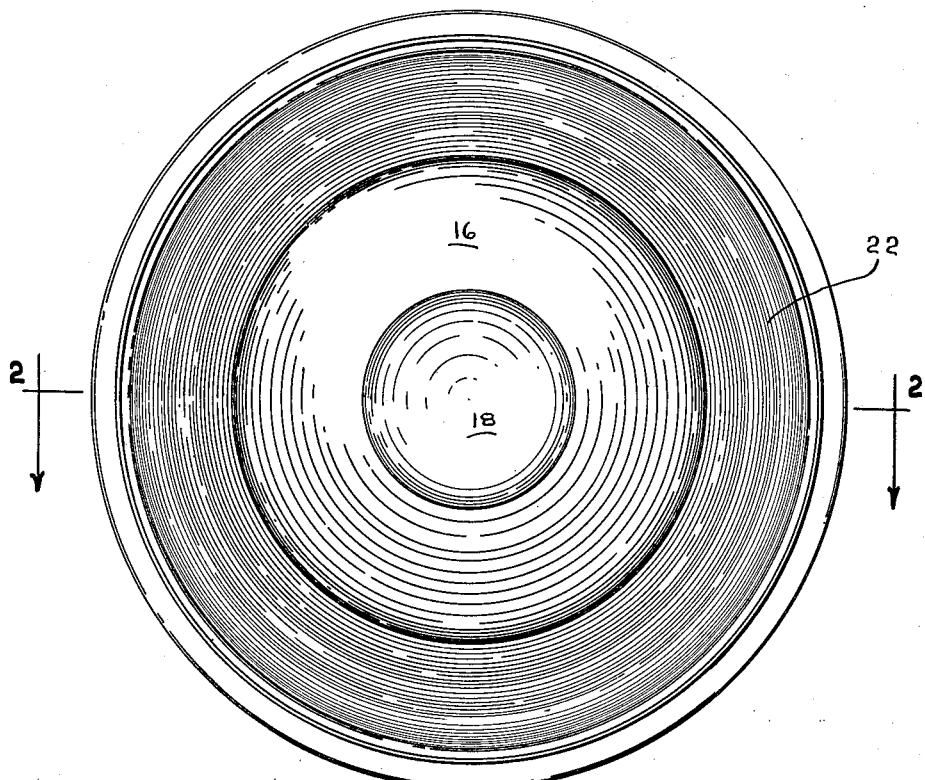

Sept. 24, 1963

A. J. SCHMITT 3,104,604

PERCOLATOR COVER

Filed Dec. 17, 1958

INVENTOR.
ARTHUR J. SCHMITT
BY John W. Michael
ATTORNEY

# United States Patent Office 3,104,604
Patented Sept. 24, 1963

3,104,604
PERCOLATOR COVER
Arthur J. Schmitt, West Bend, Wis., assignor to The West Bend Company, a corporation of Wisconsin
Filed Dec. 17, 1958, Ser. No. 780,988
1 Claim. (Cl. 99—312)

This invention relates to an improved cover for coffee percolators and similar appliances for making infusions.

Various attempts have been made in the past to design a percolator cover which will evenly distribute the hot leaching water over the coffee in the percolator basket to make full use of all water perked and thereby increase the efficiency of the device. These prior attempts relied mainly on covers (usually glass) which directed or deflected the water down on the coffee in a predetermined pattern which remains almost constant during the entire perking operation, or used such a cover in conjunction with a perforated spreader plate placed over the percolator basket. Prior covers when used alone have not produced uniform distribution and although distribution is improved by the use of a spreader plate, such a plate constitutes an extra part which not only adds to the cost of the percolator but must be cleaned and handled frequently and often becomes misplaced or lost.

It is the object of this invention, therefore, to provide a simple, durable and easily manufactured cover which provides uniform distribution without a spreader plate.

This object is attained by a one-piece metal cover for use on a percolator of conventional design having a casing, a vertical hot water ascending tube and a basket mountable in the casing. The cover has a concave central portion above the tube against which water ejected from the tube will impinge and flow outwardly over a distributing portion which extends radially outwardly and upwardly from such central portion. The central portion joins the distributing portion with a sufficiently gentle contour so as not to cause the flowing water to lose its grip on the cover, the change in contour serving as a drip ring only between percolations.

The water flowing up the sloping surface of the distributing portion falls therefrom in rings of varying diameter as the flow from the tube during the perking cycle varies from zero to maximum and back to zero. As flow approaches maximum intensity it is forced to the periphery of the distributing portion which is curved upwardly to cause the water to fly off downwardly and outwardly on to the coffee in the extreme outer confines of the basket. Thus, uniform distribution of the hot leaching water is provided without the necessity of a spreader plate.

Figure 2:
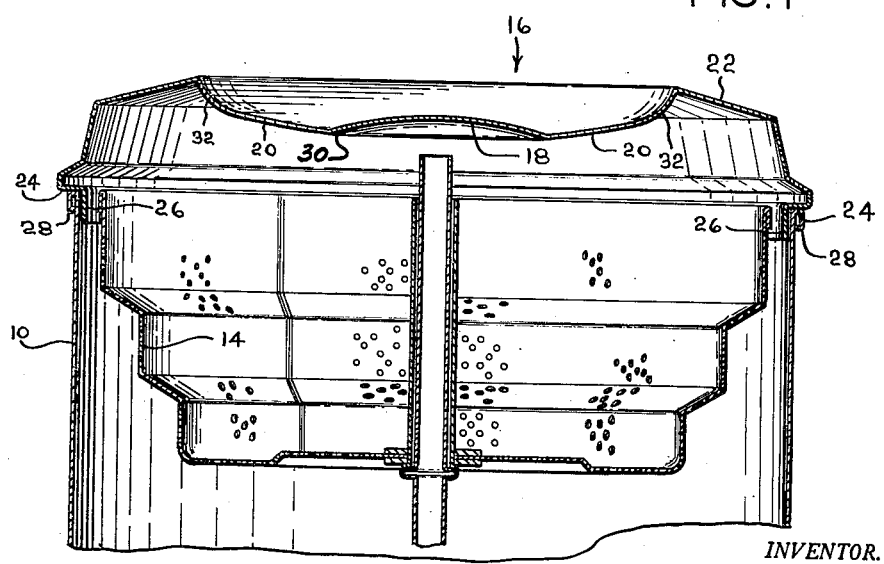

Other objects and advantages will be pointed out in, or be apparent from the specification and claim, as will obvious modifications of the one embodiment shown in the drawings, in which:

FIG. 1 is a top plan view of a percolator and cover embodying the invention; and FIG. 2 is a vertical sectional view taken along line 2—2 of FIG. 1.

Referring to the drawings, FIG. 2 shows the upper portion of a percolator having a casing 10 with a hot water ascending tube 12 and a percolator basket 14 mounted therein. The casing, tube and basket may be of any conventional design and since the specific construction of these parts is not part of this invention no detailed description of them will be made herein. Tube 12, which extends from the casing bottom (not shown) serves to eject a stream of hot leaching water upwardly against the inner surface of the percolator cover by means well known in the art. In percolators of this type the amount and force of the hot water ejected from tube 12 increases gradually from zero to maximum flow and then back to zero during a single perking cycle. The cover designated in the drawings by reference numeral 16 and described hereinafter is designed to utilize the above stated variation in flow during the conventional perking cycle and the natural adhesive and surface tension properties of water to produce uniform distribution of the hot leaching water over the coffee, tea, or other food placed in basket 14 without the use of a spreader plate.

Cover 16 may be made from any suitable material but is preferably formed from a metal stamping to provide a cover which is light, durable and inexpensive to manufacture. The cover has a circular shape with an inner downwardly facing surface including a central portion 18 lying directly above tube 12, a distributing portion 20 extending radially from the central portion and an outer peripheral portion 22 extending radially from the distributing portion. The cover is supported and positioned on casing 10 by a shoulder 24 having a depending skirt 26 formed at the peripheral edge of portion 22 with skirt 26 extending inside the casing and with shoulder 24 resting on a rolled edge 28 of the casing.

Central portion 18 of the cover is dished slightly to form a slightly concave surface against which water ejected from tube 12 will impinge and flow outwardly therealong due to the adhesive and surface tension properties of the water. Portion 18 joins distributing portion 20 with a sufficiently gentle change in contour as at 30 so as not to cause the flowing water to lose its grip on the cover. This change in contour at junction 30 serves as a drip ring only between percolations when little or no water is being ejected from tube 12.

Distributing portion 20 of the inner surface slopes upwardly and outwardly from central portion 18. Thus, water flowing from central portion 18 will flow up along portion 20 to an area determined by the force of water being ejected from tube 12 at which point the force of gravity will overcome the adhesion of water to the surface causing it to drop down on the coffee in basket 14. As the flow of water from tube 12 increases the water flowing on portion 20 will be driven further and further outwardly causing it to fall off in gradually widening rings on the coffee below.

Portion 20 is designed so that when flow from tube 12 reaches a maximum the water on portion 20 flows to the extreme outer edge of the distributing portion which is curved upwardly as at 32. This curved area 32 is sufficiently abrupt so that the momentum of the water flowing around the curve is greater than the combined adhesive and surface tension forces acting to hold the water to the surface, thus causing the water to fly off the surface in a downwardly extending radial path on to the coffee in the outer confines of basket 14.

Thus, it is seen that as percolation begins the water ejected from tube 12 will spill over on to the coffee immediately adjacent the center of the basket. As percolation intensity increases water is forced from central portion 18 of the cover up along distributing portion 20 from which it is distributed on to the coffee in rings of increasing diameter until at maximum percolation the flow reaches curved area 32 where it flies off on to the coffee in the outermost confines of the basket. As flow decreases from maximum back to zero the opposite sequence of events takes place to thereby produce uniform distribution of the hot leaching water over the entire surface of the coffee to be infused. Thus, full use is made of all water perked without the necessity of a spreader plate with its attendant disadvantages.

Although but one embodiment of the present invention has been illustrated and described, it will be apparent to those skilled in the art that various changes and modifications may be made therein without departing from the spirit of the invention or from the scope of the appended claim.

I claim:

A one-piece metal cover for a percolator having a casing, a vertical hot water ascending tube and a basket mountable in said casing comprising, a central portion above said tube, said central portion being dished upwardly to form a concave surface against which water ejected from said tube will impinge and flow outwardly therealong, an upwardly sloping distributing portion extending radially from said central portion, said distributing portion curving upwardly at its outer radial edge, said central portion joining said distributing portion with a sufficiently gentle change in contour so as not to cause the flowing water to lose its grip on the cover, said change in contour at the junction serving as a drip ring only between percolations, and a peripheral portion extending radially from said distributing portion, said peripheral portion adapted to engage said casing for supporting the cover thereon.

References Cited in the file of this patent

UNITED STATES PATENTS

| | | |
|---|---|---|
| 333,282 | Covington | Dec. 29, 1885 |
| 767,595 | Pike | Aug. 16, 1904 |
| 1,968,950 | Maigret | Aug. 7, 1934 |
| 2,010,915 | Carpenter | Aug. 13, 1935 |
| 2,011,102 | Fisher et al. | Aug. 13, 1935 |
| 2,334,752 | Clapp et al. | Nov. 23, 1943 |
| 2,511,682 | Allen | June 13, 1950 |
| 2,866,401 | Sidell | Dec. 30, 1958 |